United States Patent
Dorenbosch

(10) Patent No.: US 7,266,101 B2
(45) Date of Patent: Sep. 4, 2007

(54) FAST HANDOVER THROUGH PROACTIVE REGISTRATION

(75) Inventor: Jheroen P. Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 374 days.

(21) Appl. No.: 10/610,500

(22) Filed: Jun. 30, 2003

(65) Prior Publication Data

US 2004/0264414 A1 Dec. 30, 2004

(51) Int. Cl.
*H04Q 7/00* (2006.01)
(52) U.S. Cl. .................. 370/331; 370/338; 455/436
(58) Field of Classification Search ............. 370/311, 370/328, 329, 331, 332, 335, 336, 338, 341
See application file for complete search history.

(56) References Cited

U.S. PATENT DOCUMENTS

| | | | | |
|---|---|---|---|---|
| 5,918,172 A * | 6/1999 | Saunders et al. | ........ | 455/404.1 |
| 5,960,365 A * | 9/1999 | Leih et al. | ........ | 455/552.1 |
| 6,320,855 B1 * | 11/2001 | Shi | .......... | 370/332 |
| 6,466,556 B1 * | 10/2002 | Boudreaux | .......... | 370/331 |
| 6,526,034 B1 * | 2/2003 | Gorsuch | .......... | 370/338 |
| 6,970,719 B1 * | 11/2005 | McConnell et al. | ..... | 455/554.1 |
| 2001/0046215 A1 * | 11/2001 | Kim | .......... | 370/329 |
| 2002/0085516 A1 * | 7/2002 | Bridgelall | .......... | 370/329 |
| 2003/0046413 A1 * | 3/2003 | Sakakura | .......... | 709/229 |
| 2004/0029612 A1 * | 2/2004 | Gorsuch | .......... | 455/552.1 |
| 2004/0066757 A1 * | 4/2004 | Molteni et al. | .......... | 370/329 |
| 2004/0077374 A1 * | 4/2004 | Terry | .......... | 455/552.1 |
| 2004/0090937 A1 * | 5/2004 | Chaskar et al. | .......... | 370/331 |
| 2004/0116120 A1 * | 6/2004 | Gallagher et al. | .......... | 455/436 |
| 2004/0165563 A1 * | 8/2004 | Hsu et al. | .......... | 370/338 |
| 2004/0218575 A1 * | 11/2004 | Ibe et al. | .......... | 370/338 |

* cited by examiner

*Primary Examiner*—Bob A. Phunkulh

(57) ABSTRACT

A method and apparatus for a fast handover of a link with a communications unit between a first and a second wireless communications network includes a receiving device (203, 231) for receiving signals from a first and a second wireless communications network (106, 120), a controller (207) for detecting a condition indicative of initiating a communication over the first network, and a transmitting device (205, 233) operating cooperatively with the receiving device and the controller to operate exclusively on the first wireless communications network and to facilitate registration with the second wireless communications network when the condition is detected.

25 Claims, 3 Drawing Sheets

FAST HANDOVER THROUGH PROACTIVE REGISTRATION

FIELD OF THE INVENTION

The present invention relates in general to wireless communications units and wireless networks, and more specifically to a method and apparatus for providing a fast handover of such wireless communications units between wireless networks through proactive registration.

BACKGROUND OF THE INVENTION

Loosely coupled Wireless Local Area Networks (WLAN) supported by WLAN servers, such as enterprise servers provide a user with such amenities as high-speed wireless Internet access and an inexpensive alternative for telephony services as well as other real-time applications. The user can carry a wireless communications unit (referred to as a communications unit) with dual-use capability so that the communications unit can provide voice communication over an enterprise server when the communications unit is in a WLAN and over a cellular wireless area network (WAN or cellular network) such as 3G when the communications unit is outside of the WLAN.

When the communications unit has a link to a first network (i.e., is on a call or is communicating over the first network) and is moving to a second network such as, for example, from a WLAN to a cellular network, it is desirable that the first network handover the link to the second network, preferably with minimal undesirable effects on the communications unit service. Since it may take a relatively long time (10s) to bring up the software and hardware necessary to operate in and register with a system, the user can experience unsatisfactory service or worse a dropped call or link. Conversely, registration with multiple systems at all times will seriously reduce battery life, so it is impractical to maintain registration with more than one network when it is not necessary.

Therefore, what is needed is a method and apparatus for providing a fast handover of a link or a connection to a communications unit between a first and a second wireless communications network without undue reduction in battery life.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
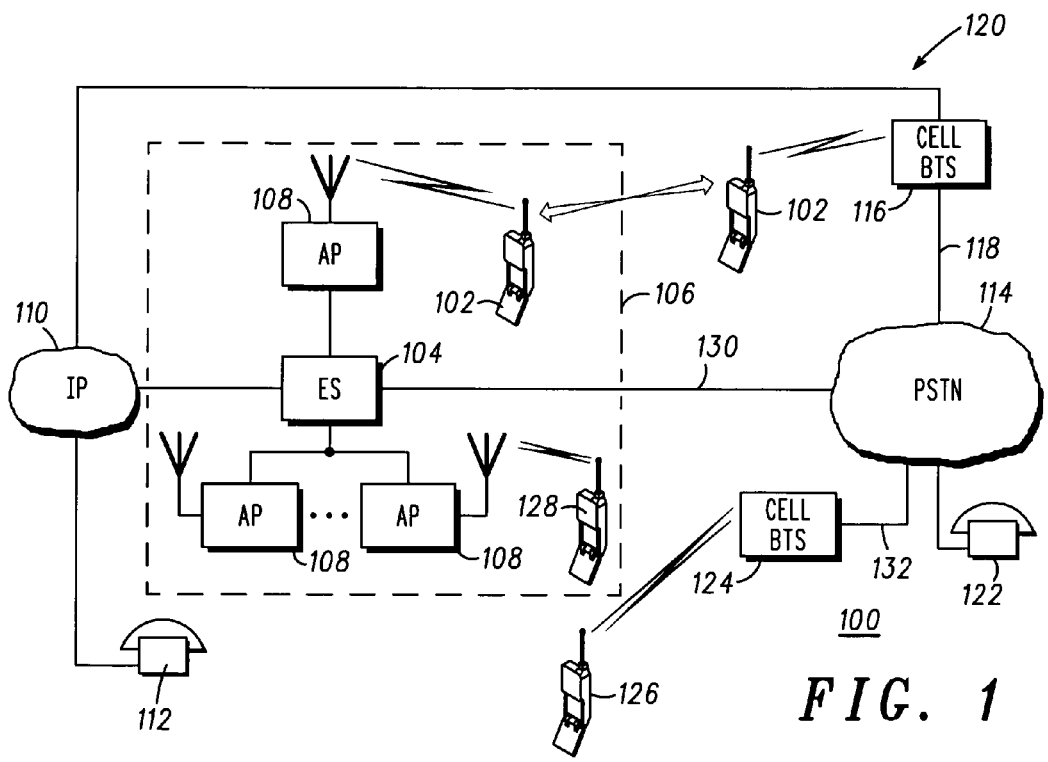
FIG. 1 depicts, in a simplified and representative form, an exemplary environment in which a method and apparatus for providing a fast handover through proactive registration are implemented.

In overview, the present disclosure concerns wireless communications devices or units, often referred to as communications units, such as cellular phone or two-way radios and the like that have dual operating mode capability and communications systems that provide services such as voice and data communications services to communications units. More particularly various inventive concepts and principles are embodied in systems, communications units, and methods therein for providing the communications unit that is registered with a first network with proactive registration with a second network to facilitate a seamless handoff or handover of a communications link. Note that communications unit may be used interchangeably herein with wireless subscriber device or unit and each of these terms denotes a device ordinarily associated with a user and typically a wireless mobile device that may be used with a public network in accordance with a service agreement or within a private network. Examples of such units include personal digital assistants, personal assignment pads, and personal computers equipped for wireless operation, a cellular handset or device, or equivalents thereof provided such units are arranged and constructed for operation in different networks.

The communication systems and communications units that are of particular interest are those that may provide or facilitate voice communications services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, integrated digital enhanced networks and variants or evolutions thereof. Furthermore the wireless communications units or devices of interest have short range wireless communications capability normally referred to as WLAN capabilities, such as IEEE 802.11, Bluetooth, or Hiper-Lan and the like that preferably utilize CDMA, frequency hopping, OFDM or TDMA access technologies and one or more of various networking protocols, such as TCP/IP (Transmission Control Protocol/Internet Protocol), UDP/IP (Universal Datagram Protocol/IP), IPX/SPX (Inter-Packet Exchange/Sequential Packet Exchange), Net BIOS (Network Basic Input Output System) or other protocol structures.

As further discussed below various inventive principles and combinations thereof are advantageously employed to facilitate a handover of a communications link from a first wireless communications network (first network) to a second wireless communications network (second network) by providing for proactive registration with the second network when, for example communication over the first network is initiated. In this manner, advantageously the battery life of a communications unit utilizing the methods and apparatus of the present invention can be noticeably extended versus the battery life of a communications unit that maintains registration with both the first network and the second network at all times and at the same time the time delay and resultant service problems are resolved.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring now to FIG. 1, a simplified and representative environment or system 100 in which a method and apparatus for providing a fast handover through proactive registration are implemented will be discussed and described. The system 100 generally shows a communications unit 102 that is movable between service from a first wireless communications network (first network) 106 and service from a second wireless communications network (second network) 120. In this exemplary embodiment, the first network 106 is a wireless local area network (WLAN) provided by an enterprise server 104 through a plurality of Access Points (APs) 108, and the second network 120 is preferably a cellular packet data network or other cellular or cellular like network otherwise referred to as a cellular wide area network (cellular WAN) provided by the communications unit's local cellular base transmitter site(s) (BTS) 116. A coverage area of the second network overlaps a coverage area of the first network. For example, the local cellular BTS 116 provides cellular WAN coverage that overlaps the WLAN. It is understood that in general more than one local cellular BTS may provide such coverage. For brevity, only one such BTS 116 is shown in the figures and referred to below.

The enterprise server 104 has a connection 130 to the PSTN and may serve a single enterprise location or may serve multiple enterprise sites, possibly located in different cities. Despite its name the enterprise server 104 may serve a WLAN hotspot, or multiple WLAN hotspots. It may also serve one or more WLAN coverage areas in private homes that may be connected to the enterprise server 104 by such means as an IP broadband connection.

The communications unit 102 may be in contact with, for example, communications unit 112 via an Internet Protocol (IP) connection 110, communications unit 122 via the public switched telephone network (PSTN) 114, wireless communications unit 126 via another BTS 124 or cellular WAN, or a communications unit 128 via the WLAN. As appreciated by those skilled in the art, the cellular WAN connects the IP connection 110 to the cellular BTS 116 for data traffic and a voice network 118, specifically voice network of a cellular system, connects the BTS 116 to the PSTN 114 for voice traffic and for the signaling required to conduct legacy voice calls. The communications unit 102 may also be in contact with a wireless communications unit 126 via the same or another cellular WAN that connects the communication unit 126 to a cellular BTS 124 for data traffic. A voice network 132, specifically voice network of a cellular system, connects the BTS 124 to the PSTN 114 for voice traffic and for the signaling required to conduct legacy voice calls. Note that while there are in fact many cellular operators, each operating a cellular WAN system, the composite of each of these cellular WANs could comprise or be viewed as the cellular WAN system with constituent elements, such as switching centers, base transmitter controllers, base transmitters, visitor and home location registers, billing systems, etc.

In FIG. 1 as is known the communications units are mobile and can move around within the WLAN or the WAN and routinely move out of range of the WLAN, e.g. into the WAN and vice versa. When this happens with a call or communications in progress a handover or handover of the ongoing communication from one system to the other is required. As earlier noted for a handover to be accomplished a registration, etc. on the system the communication is being handed to is required. This registration can take more time than is available and result in dropped calls or unsatisfactory service.

Figure 2:
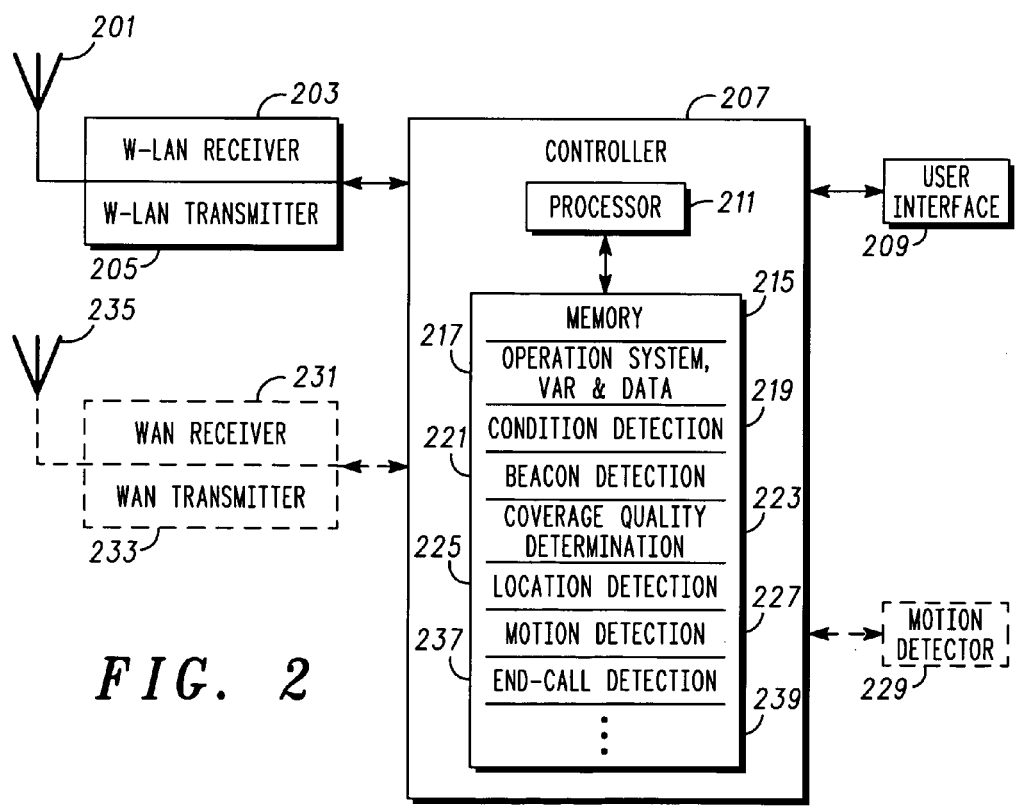
FIG. 2 depicts a block diagram of a communications unit arranged for facilitating a handover of a communications link between two wireless communications networks through proactive registration.

Referring to FIG. 2, a block diagram of a preferred embodiment of the communications unit 102 arranged for facilitating handover of a communications link between two wireless communications networks through proactive registration will be discussed and described. The communications unit 102 is generally known other than the modifications and improvements disclosed herein. Thus the known functions and structure of such devices will not be described in detail other than as related to the inventive principles and concepts disclosed and discussed below. The communications unit 102 includes an antenna 201 that operates to absorb and radiate radio frequency signals that are received from the first network 106. For example, radio signals that are transmitted from the WLAN, such as, for example, an access point (LAN transceiver) coupled to the enterprise server 104 are absorbed by the antenna 201 and coupled to a first receiver 203, which, in this exemplary embodiment is also referred to as a WLAN receiver. The radio signals that are transmitted from the WLAN, thus received by the first receiver 203, may include a beacon signal to be discussed later in connection with FIGS. 3-5. Signals that are amplified by and coupled from a first transmitter 205 (in this example WLAN transmitter), to the antenna 201 are radiated or transmitted or sent to the access point and thus the enterprise server 104 according to known WLAN technologies, such as 802.11 and others earlier mentioned. The first receiver and transmitter 203, 205 are inter coupled as depicted and interactively operate with and are controlled by a controller 207 to provide to, or accept or receive from the controller 207, voice traffic or data messages or signals corresponding thereto as is also known.

The communications unit 102 also includes an antenna 235 that may be physically separate from or included with the antenna 201 and operates to absorb and radiate radio frequency signals that are received from a second network 120. The communications unit 102 also includes a second receiver 231, in this exemplary embodiment referred to as a WAN receiver, to which the absorbed signals from the cellular BTS 116 are coupled. The communications unit 102 also includes a second transmitter 233 referred to as a WAN transmitter in this example, that amplifies and provides the signals for transmission or radiation by the antenna 235 to a cellular network such as the local cellular BTS 116 as is known. The second receiver and transmitter 231, 233 are inter coupled as depicted and interactively operate with and are controlled by the controller 207 to provide to, or accept or receive from the controller 207, voice traffic or data messages or signals corresponding thereto in a similar manner as the first receiver and transmitter 203, 205.

Accordingly, the first receiver and transmitter 203, 205 and the second receiver and transmitter 231, 233 as controlled by and in cooperation with the controller 207 and functions thereof provide the communications unit 102 with dual operating mode capability. More particularly, the communications unit 102 is capable of registering with and obtaining service from a cellular network or WAN provided by, for example, the local cellular system, e.g. corresponding BTS 116 as well as a WLAN as provided by the enterprise server 104 coupled to the plurality of access points 108. However, the communications unit 102 can optionally have only one receiver and one transmitter that are adaptable and configurable to interface with both the first and second networks 106, 120 and that are coupled to and controlled by the controller 107. For purposes of simplifying this disclosure, only one receiver and one transmitter will be discussed, and will be referred to as a receiving device and a transmitting device. The receiving device has the capabilities of both the first and second receivers 203, 231 and therefore receives signals from the first and the second networks 106, 120, and the transmitting device has the capabilities of both the first and second transmitters 205, 233.

The controller 207 is coupled to and generally operates in a known manner, except for the modifications required according to the principles and concepts discussed here, together with a user interface 209 that includes, for example, audio transducers, such as an earphone or speaker and microphone, a display and a keypad. The transmitting device, receiving device and user interface 209 are each inter coupled, as depicted to the controller 207 and the controller 207 provides overall operational command and control for the communications unit 102. The controller 207 is coupled to and operates together with the display and keyboard or set of keys to effect a portion of a user interface experience that may depend on the particular device and its features and to facilitate generation and consumption of messages or other information. The keyboard can be a known physical keyboard or virtual keyboard that is part of the display and the display is also known and may be a liquid crystal display or the like. If the keys are part of a virtual keyboard the display will need to be touch sensitive or the like in order to convey information to the controller. Similarly the earphone, speaker and microphone are known and widely available.

The controller 207 is essentially a general-purpose processor and, preferably, includes a processor 211 and an associated memory source or memory 215. The processor 211 is, preferably, a known processor based element with functionality that will depend on the specifics of the air interface with the first network 106 and the second network 120 as well as various network protocols for voice and data traffic. The processor 211 will operate to encode and decode voice and data messages to provide signals suitable for a transducer or further processing by the controller 207. The processor 211 may include one or more microprocessors, digital signal processors, and other integrated circuits depending on the responsibilities of the controller 207 with respect to signal processing duties that are not here relevant.

In any event the controller 207 also includes the memory source or memory 215 that may be, for example, a combination of known RAM (Random Access Memory), ROM (Read-Only Memory), EEPROM (Electrically Erasable Programmable ROM) or magnetic memory. The memory source 215 is used to store among various other items or programs etc., an operating system or software, data, and variables 217 for the processor 211. This operating software 217 when executed by the processor 211 will result in the processor 211 performing the requisite functions of the communications unit 102 such as interfacing with the user interface 209 and transceivers or transmitting device and receiving device. The memory 215 further includes call processing routines not specifically shown for supporting voice and data calls that will be appreciated by one of ordinary skill and that will vary depending on air interface, call processing, and service provider or network specifics.

As depicted, the memory 215 further includes space for a condition definition and detection routine or function 219 that is for detecting a condition indicative of, for example, initiating communication, also referred to as an action preparatory to initiating a call, over the first network 106. This condition may be, for example, at least one of accessing a communications unit phone book, dialing a number, opening a hinged cover of the communications unit 102, and entering a key for access to the communications unit 102, or any other condition that could potentially or likely lead to the initiation of communication over the first network 106. These conditions may be communication unit specific and in any event can be experimentally determined and modified as experience dictates.

The transmitting device, receiving device and controller 207 operate cooperatively for facilitating a communication over the first network 106 and for facilitating registration with the second network 120 when the controller 207 detects a condition indicative of initiating communication. More specifically, when the condition detection program 219 detects a condition indicative of initiating communication over the WLAN, such as, for example, the accessing of a communications unit phone book, the transmitting device, receiving device and controller 207 access the software and hardware corresponding to the cellular WAN, also referred to as calling up a stack corresponding to the WAN, and begin registering with the WAN. The condition detection program 219 will be discussed in further detail with respect to FIG. 3.

In some embodiments, various functions, circumstances or second conditions, such as conditions regarding the first network 106 and the second network 120 and the operational and physical status of the communications unit 102 are also important and advantageously impact the operation of the communications unit. These second conditions are detected or found using software algorithms or routines that are also included in the memory 215. For example, using a beacon detection function 221 the controller 207 detects if a beacon signal indicative of a location of the communications unit is received by the receiving device. A coverage quality determination function 223 determines coverage quality by, for example assessing signal strength, bit or frame error rates and the like, corresponding to at least one of the first network 106 and the second network 120 or available links from the communications unit to these networks. Other functions include a motion detection function 227, a location detection function 225 and an end of call function 237. To utilize certain of the above functions, the communications unit 102 may also need at least one of a location detecting device (not shown) that is, for example, a known Global Positioning System (GPS) device or any other device capable of detecting a physical location of the communications unit and a motion detector 229, which can be, for example, an accelerometer, a GPS system, or any other means for detecting a physical movement of the communications unit and that is in communication with the controller 207.

One or more of the functions 221, 223, 225, 227 and 237 as well as additional not listed functions 239 can be used in combination with the condition detection function 219 to determine if and when the communications unit 102 registers with the second network 120. The functions 221, 223, 225, 227 and 237 and impact on the operation of the communication unit will be discussed in further detail with respect to FIGS. 3 and 4.

Figure 3:
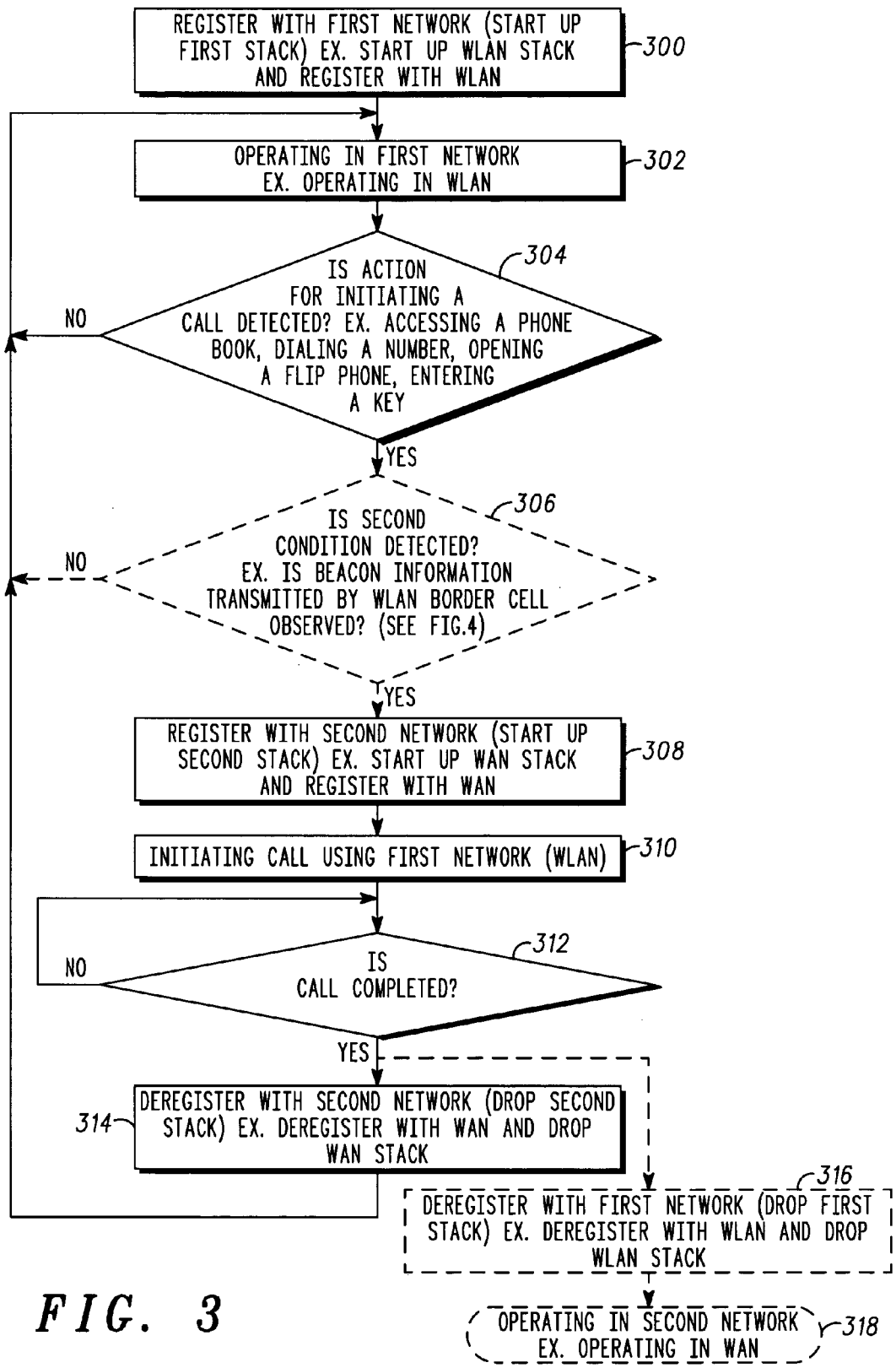
FIG. 3 illustrates a diagram of a preferred method embodiment of providing a handover of a communications link between two wireless communications networks.

Referring now to FIG. 3, a diagram of a preferred method embodiment of providing a handover of a communications link between two wireless communications networks will be reviewed and discussed. Some of this discussion will be in the nature of a review and summary of portions of the discussions above. The method may be implemented with and will be explained in conjunction with and reference to the communications unit of FIG. 2 operating in the environment of FIG. 1. The method begins at 300 with the registration of the communications unit 102 with the first network 106, for example the WLAN, and starting up of a first stack (initializing and launching various requisite software routines and establishing present parameters corresponding to network and unit circumstances) corresponding to the first network, for example a WLAN stack. For example known tasks, referred to as starting a stack can include registration of the communications unit 102 with the WLAN including association with one of the APs 108 and this may involve contacting an AAA server for authentication, authorization and accounting of the communications unit's WLAN access, At 302 as depicted, the communications unit 102 operates exclusively on the first network 106.

Then, at 304 it is determined if an action preparatory to or condition indicative of initiating a communication or call as described above is detected by the controller 207 using the condition detection function 219. This call or communication can be, for example, one of a telephony voice call, a dispatch call, or a multimedia call. If the action is not detected, the communications unit 102 continues to operate in the first network 106 and check or test for the condition at 302, 304.

Upon detection of the action or condition and ignoring the preferred but optional process at 306 for the moment, at 308 the communications unit 102 proceeds to register or facilitate registration with the second network 120 and start up a second stack corresponding to the second network 120. For example, if at 304 the controller 207 of the communications unit 102 operating in the WLAN detects the dialing of a number, accessing a phone book, entering a key or PIN, etc, the communications unit 102 proceeds to start up the cellular WAN stack and register with the cellular WAN. Starting the WAN stack is known and include registration where registration with the various known legacy cellular systems depend on the specifics of the cellular protocol being used at the BTS 116 and may involve use of information stored on a Subscriber Interface Module (SIM) card in the communications unit and access of a Home Location Register (HLR) and an Authentication Center (AuC) for location tracking and authentication.

At 310 the call is initiated using the first network 106 and a link or connection is made with the first network 106.

Given that the registration at 308 has been completed, the communications unit is ready to rapidly execute a handover of the ongoing call from the first to the second system, if the need for such a handover arises. The specifics of deciding whether a handover is required are beyond the scope of this disclosure but would include determining that ongoing service with the present network is not feasible, not practical, or no longer appropriate for some reasons.

At 312 the controller 102 determines if the call is completed using the end-call detection function 237. When, for example, the controller 207 detects a condition indicative of a completion of the communication over the first network 106 or a completion of a communication over the second network, e.g. a hang-up or activation of a call ending button, using the end-call detection function 237, the communications unit 102 deregisters with at least one of the first and second networks 106, 120 at 314, 316. Note that preferably the communications unit remains registered for a short duration, for example 10 sec, to account for users that place a call soon after another one ends. This reduces the number of registrations and de-registrations and of course improves the handover availability and success rate, if needed on or for a subsequent call. Furthermore when the condition or action or circumstances that resulted in the registration on the second network subsequently disappear or in the end do not result in a call or communication being initiated on the first network the communications unit will de-register with the second network. For example, suppose the phone book is accessed, which is often but not always a precursor to placing a call. If no call is initiated the communications unit, in the interest of battery life, will deregister at some point. After a predetermined duration the communications units acts as though it had determined that the call is completed.

Specifically, in case the communications unit 102 does not handover to the second system during the call, at 314 the communications unit 102 deregisters with the second network 120, drops the second stack since this hardware and software are no longer needed, and continues to operate in the first network 106. Alternately, in case the communications unit 102 does handover to the second system during the call, at 316 the communications unit 102 deregisters with the first network 106, drops the first stack, and at 318 operates in the second network 120.

For example, at 310 the call is initiated over the WLAN and if at 312 the controller 207 determines that the call is completed, the communications unit deregisters with the cellular WAN and drops the cellular WAN stack at 314 or deregisters with the WLAN and drops the WLAN stack at 316 and operates in the cellular WAN at 318.

As discussed above, the registration of the second network at 308 may also be dependent upon whether a second condition is met. At 306, the controller 207 determines if the second condition is detected before the communications unit 102 proceeds to registration with the second network at 308. For example, the controller 207 determines whether a beacon signal, e.g. beacon information, is detected in addition to the action before proceeding to registration with the second network at 308. This will be discussed in further detail in connection with FIG. 4.

It should be noted that the initiating of the call using the first network at 310 can take place before the registering with the second network at 308, after the registering with the second network at 308, or, and typically, both proceed in parallel. This method as discussed above will significantly improve the standby battery life of a communications unit that usually remains inside coverage of the first network. If the communications unit never initiates calls, there is little need for the communications unit to ever bring up the stack for the second network or to register with it. However, this method may not provide improvement in talk time for compulsive callers that are on phone calls for a large fraction of the time (such as some service or sales personnel). In that case, both stacks may frequently be running at the same time and a large number of registrations and de-registrations may be done with the second network. To address this problem, the preferred embodiment applies a second condition at 306

Figure 4:
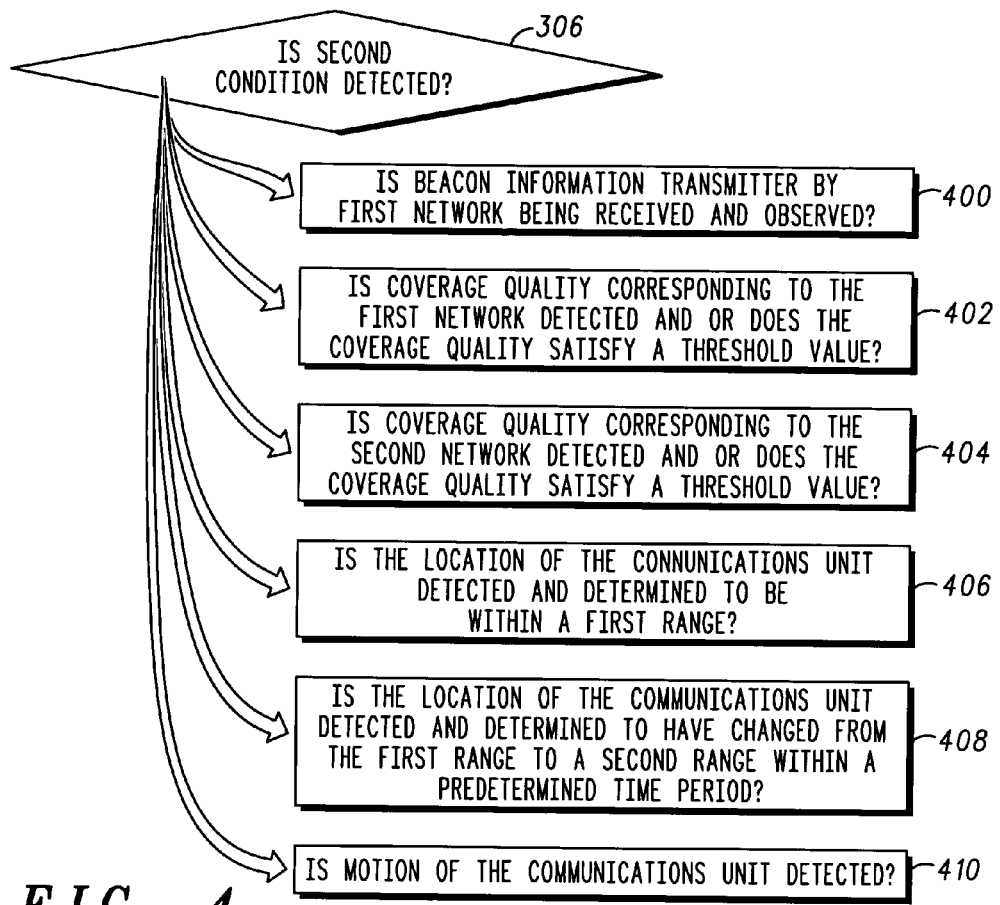
FIG. 4 illustrates a more detailed diagram of a preferred embodiment of a portion of the FIG. 3 method.

Referring now to FIG. 4, a more detailed diagram of a preferred embodiment of a portion of the FIG. 3 method will be reviewed and discussed. Specifically, FIG. 4 lists some exemplary second conditions, of which one or more may occur to satisfy the detection of the second condition at 306 before proceeding to 308. For example, at 400, the controller 207 determines if beacon information that was transmitted by the first network 106 is being received and observed (detected) using the beacon detection function 221. WLAN beacon information is typically transmitted by an Access Point at regular intervals. The communications unit can also obtain the beacon signal, specifically beacon information, by sending a probe to the WLAN and getting a response back from the access point. The beacon information is preferably indicative of a location of the communications unit, for example an access point identity, or a special border or egress point indication in the beacon frame information, and may be observed near a border of a coverage area of the first network 106. When the controller 207 has detected the action preparatory to initiating a call and detects the beacon signal, the communications device 102 registers or facilitates registration with the second network 120.

Alternately, at 402 the controller 207 detects a coverage quality, signal strength, signal to interference ratio, etc., corresponding to the first network 106 using the coverage quality determination function 223. In addition, the controller 207 may determine if the coverage quality satisfies a predetermined threshold, e.g. is less than a predetermined signal to interference ratio. Upon the detection of the action preparatory to making a call and at least one of the detection of the coverage quality and the satisfying of the threshold, the communications unit 102 registers with the second network 120.

Or, at 404, the controller 207 detects coverage quality corresponding to the second network 120 using the coverage quality determination function 223. The controller 207 may further determine if the coverage quality satisfies a predetermined threshold. Upon the detection of the action preparatory to making a call and at least one of the detection of the coverage quality and the satisfying of the threshold, the communications unit 102 registers or facilitates registration with the second network 120. Note that these threshold can be experimentally determined by one of ordinary skill and can represent a tradeoff between battery life and possible call or link drops.

At 406 the controller 207 detects a location of the communications unit and may determine if the location is within a first predetermined range (first range) of a WAN BTS using the location detection function 225, by measuring the received signal strength, or from the timing advance value (corresponds to path length thus likely attenuation) that the communications unit is being instructed to use. Upon the determination that the location is within the first range and the detection of the action preparatory to making a call, the communications unit 102 registers with the second network. Alternately, at 408, the controller 207 uses the location detection function 225 to determine whether the location of the communications device 102 has changed from the first range to a second predetermined range (second range) within a predetermined time period. Upon the determination that the location has changed from within the first range to within the second range within the time period and the detection of the action preparatory to making a call, the communications unit 102 registers or facilitates registration with the second network. In yet another alternative, the communications unit determines the range by comparing geographic location information from the location detection 225 with preprogrammed geographic location information on the location of the WLAN 106, thereby detecting the condition that the communications unit is within the range of the WLAN.

At 410, the controller 207, in cooperative operation with the motion detector 229 and using the motion detection function 227, detects a motion of the communications unit. Upon the detecting of action preparatory to making a call and the detecting of the motion, the communications unit 102 facilitates registration and registers with the second network. Alternately, the controller 207 can determine if the motion exceeds a predetermined motion threshold and the communications unit 102 may register or facilitate registration with the second network upon the determination that the motion exceeds a predetermined motion threshold and the detection of the action or first condition. The motion can also be integrated over a predetermined time interval to obtain a displacement. This integrated motion can then be compared with a threshold to detect a significant displacement. The communications unit 102 may register or facilitate registration with the second network upon the determination that the integrated motion exceeds a predetermined motion threshold and the detection of the action or first condition.

Note that the various thresholds or predetermined thresholds noted above can be experimentally determined by one of ordinary skill and may require adjustment with experience. A user may find it advantageous to be able to selectively enable the various conditions or modify the predetermined thresholds.

Figure 5:
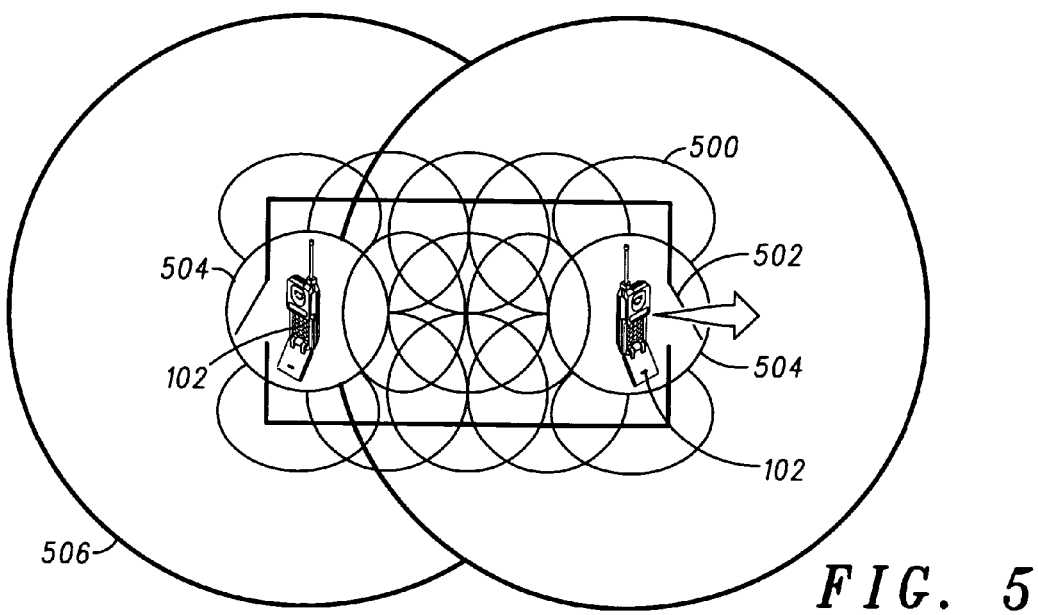
FIG. 5 depicts, in a simplified and representative form, another exemplary environment in which the method and apparatus for providing a fast handover through proactive registration are implemented.

Referring now to FIG. 5, a further simplified and representative exemplary environment in which the method and apparatus for providing a fast handover through proactive registration are implemented will be reviewed and discussed. In operation the communication unit 102 as depicted in FIG. 5 is operating exclusively on the WLAN in which access points 108 are producing WLAN access cells 500 and therefore links to the WLAN 106 during calls or communications. However, as soon as the controller 207 detects a condition indicative that a user is about to initiate a call, for example, searching through the communications unit phone book, the communications unit 102 registers with and brings up the stack for the cellular WAN 506 that covers the periphery of and likely overlaps with the WLAN service area.

In addition, near ingress/egress points 502, which are inherently locations in which entrance to and exit from the WLAN are likely, the access points produce WLAN border cells 504. The access points for the border cells 504 emit a beacon signal that includes beacon information, which informs the communications unit 102 that it is near the border of the WLAN service area. In one exemplary embodiment, as soon as the controller 207 detects a condition indicating that a user is about to initiate a call, for example searching through the communications unit phone book, and the receiver and controller receive and detect, respectively, the beacon signal, specifically beacon information from a border cell, the communications unit 102 brings up the stack and then registers with the cellular WAN 506 located on the periphery of the WLAN service area. Alternately, as soon as a user of the communications unit 102 dials a number on the communications unit key pad and the controller detects that the communications unit 102 is moving, the communications unit 102 registers with and brings up the stack for the cellular WAN 506. Therefore, when it is likely that a user of a communications unit will move outside the WLAN service area, the communication unit is already connected to the cellular WAN 506.

In this manner, proactive registration or registering with the second network concurrently with or before a call is initiated provides for increased battery life because the communication units are not always linked to both the first and the second networks. In addition, proactive registration reduces the likelihood of dropping a call or communication or experiencing poor network service when a communications unit is handed over from a first network to a second network by initiating registration with the second network before it is required.

It should be noted that the methods and apparatus described above for proactive registration may be implemented in reverse or with different communications networks than those discussed above. For example, the first wireless communications network may be the cellular WAN and the second network may be the WLAN. The communications unit then operates in WAN and when the communications device detects an action preparatory to making a call over the cellular WAN, registers with and brings up the stack for the WLAN. For example, it is not essential that the WLAN and WAN are loosely coupled. They may also be tightly coupled, for example in a manner such that the ES appears as another mobile switching center to the cellular systems 118, 132, or that is appears as a legacy Base Station Controller to the cellular system 118, 132.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A communications unit comprising:
   a receiving device for receiving signals from a first and a second wireless communications network;
   a controller, coupled to and controlling the receiving device, for detecting a condition indicative of initiating communication over the first wireless communications network; and
   a transmitting device, coupled to and controlled by the controller, and cooperatively operating with the receiving device and the controller for facilitating the communication over the first wireless communications network and for facilitating registration with the second wireless communications network when the controller detects the condition.

2. The communications unit of claim 1, wherein the receiving device is further for receiving a beacon signal;
   wherein the controller is further for detecting beacon information included with the beacon signal, the beacon information indicative of a location of the communications unit; and
   wherein the registration with the second wireless communications network is facilitated when the controller detects both the condition and the beacon information.

3. The communications unit of claim 1, wherein the controller is further for determining a coverage quality corresponding to the first wireless communications network, and wherein the registration with the second wireless communications network is facilitated when the controller detects the condition and when the controller determines that the coverage quality satisfies a predetermined threshold.

4. The communications unit of claim 1, wherein the controller is further for determining a coverage quality corresponding to the second wireless communications network, and wherein the registration with the second wireless communications network is facilitated when the controller detects the condition and when the controller determines that the coverage quality satisfies a predetermined threshold.

5. The communications unit of claim 1, wherein the controller is further for detecting an other condition indicative of one of a completion of the communication over the first wireless communications network, a completion of a communication over the second wireless communications network, and when the communication was never initiated, and wherein the controller cooperatively with the transmitting device and the receiving device facilitates deregistration from at least one of the first wireless communications network and the second wireless communications network when the controller detects the other condition indicative of the completion of the communication.

6. The communications unit of claim 1, wherein the controller is further for detecting a location of the communications unit, and wherein the registration with the second wireless communications network is facilitated when the controller detects the condition and that the location of the communications unit is within a first predetermined range.

7. The communications unit of claim 6, wherein the controller is further for detecting if the location of the communications unit is within a second predetermined range, and wherein the registration with the second wireless communications network is facilitated when the controller detects the condition and that the location of the communications unit has changed from the first predetermined range to the second predetermined range within a predetermined time period.

8. The communications unit of claim 1, further comprising a motion detector in communication with the controller for detecting a motion of the communications unit, and wherein the registration with the second wireless communications network is facilitated when the controller detects the condition and that the motion of the communications unit exceeds a predetermined motion threshold.

9. The communications unit of claim 1, wherein the condition comprises at least one of:
   accessing a communications unit phone book; dialing a number; opening a hinged cover of the communications unit; and entering a key for access to the communications unit.

10. The communications unit of claim 1, wherein the first wireless communications network comprises a first one of a wireless local area network (WLAN) and a wireless wide area network (WAN) and wherein the second wireless communications network comprises a second one of the WLAN and the WAN.

11. A computer-readable medium containing computer instructions for instructing a processor to perform a method for facilitating a fast handover of a link with a communications unit between a first and a second wireless communications network, the instructions comprising:
registering with the first wireless communications network;
detecting a condition indicative of initiating a communication over the first wireless communications network; and
registering with the second wireless communications network upon the detecting of the condition.

12. The computer-readable medium of claim 11, further comprising:
detecting a beacon signal indicative of a location of the communications unit; and
registering with the second wireless communications network upon the detecting of the condition and the detecting of the beacon signal.

13. The computer-readable medium of claim 11, further comprising:
determining a coverage quality corresponding to at least one of the first and the second wireless communications networks; and
registering with the second wireless communications network upon the detecting of the condition and the determining of the coverage quality.

14. The computer-readable medium of claim 11, further comprising:
initiating the communication over the first wireless communications network.

15. The computer-readable medium of claim 14, further comprising:
completing the communication over the first wireless communications network; and
deregistering from at least one of the first and the second wireless communications networks upon the completing of the communication.

16. A method for facilitating handover of a link with a communications unit between wireless communications networks employing different technologies, the method comprising:
operating exclusively on a first wireless communications network;
detecting an action preparatory to initiating a call;
initiating the call using the first wireless communications network; and
upon the detecting of the action, registering with a second wireless communications network.

17. The method of claim 16, further comprising:
observing beacon information transmitted by the first wireless communications network near a border of a coverage area of the first wireless communications network;
registering with the second wireless communications network upon the detecting of the action and the observing of the beacon information transmitted by the first wireless communications network.

18. The method of claim 16, further comprising:
detecting coverage quality corresponding to the first wireless communications network; and
registering with the second wireless communications network upon the detecting of the action and the detecting of the coverage quality.

19. The method of claim 16, further comprising:
detecting coverage quality corresponding to the second wireless communications network; and
registering with the second wireless communications network upon the detecting of the action and the detecting of the coverage quality.

20. The method of claim 16, further comprising:
completing the call over the first wireless communications network; and
de-registering from at least one of the first and the second wireless communications networks upon the completing of the call.

21. The method of claim 20, wherein the operating exclusively on the first wireless communications network further comprises starting up a first stack corresponding to the first wireless communications network;
wherein the registering with the second wireless communications network further comprises starting up a second stack corresponding to the second wireless communications network; and
wherein the de-registering from the at least one of the first and the second wireless communications networks comprises dropping at least one of the first and the second stacks.

22. The method of claim 16, further comprising:
detecting a location of the communications unit;
determining if the location of the communications unit is within a first predetermined range; and
registering with the second wireless communications network upon the detecting of the action and the determining if the location of the communications unit is within the first predetermined range.

23. The method of claim 22, further comprising:
determining if the location of the communications unit changes from the first predetermined range to a second predetermined range within a predetermined time period; and
registering with the second wireless communications network upon the detecting of the action and the determining if the location of the communications unit changes from the first predetermined range to the second predetermined range within the predetermined time period.

24. The method of claim 16, further comprising:
detecting a motion of the communications unit; and
registering with the second wireless communications network upon the detecting of the action and the detecting of the motion of the communications unit.

25. The method of claim 16, wherein the first wireless communications network comprises a first one of a wireless local area network (WLAN) and a wireless wide area network (WAN) and wherein the second wireless communications network comprises a second one of the WLAN and the WAN.

* * * * *